United States Patent [19]

Aoki

[11] Patent Number: 4,832,961
[45] Date of Patent: May 23, 1989

[54] APPARATUS FOR QUANTITATIVELY PROVIDING FOOD MATERIAL

[75] Inventor: Shigeru Aoki, Utsunomiya, Japan

[73] Assignee: Rheon Automatic Machinery Co., Ltd., Utsunomiya, Japan

[21] Appl. No.: 137,612

[22] Filed: Dec. 24, 1987

[30] Foreign Application Priority Data

Dec. 26, 1986 [JP] Japan ................... 61-308845

[51] Int. Cl.[4] .................. A21C 11/18; A23G 9/28
[52] U.S. Cl. .................... 425/239; 99/450.7; 222/381; 425/437; 426/512
[58] Field of Search ............ 425/238, 239, 437; 426/512; 99/450.7, 450.8; 222/309, 381

[56] References Cited

U.S. PATENT DOCUMENTS

| 4,273,789 | 6/1981 | Zimmerman | 425/512 |
| 4,302,173 | 11/1981 | Persson | 425/238 |
| 4,632,657 | 12/1986 | Potoczky | 425/437 |
| 4,669,967 | 6/1987 | Hayashi et al. | 99/450.8 |
| 4,776,497 | 10/1988 | Hayashi et al. | 222/235 |

FOREIGN PATENT DOCUMENTS

2078155 A  1/1982  United Kingdom ............... 425/437

Primary Examiner—George Yeung
Attorney, Agent, or Firm—Finnegan, Henderson, Farabow, Garrett & Dunner

[57] ABSTRACT

An apparatus and method for quantitatively providing food material, in particular, a low fluid food material is provided. In the apparatus, the material is propelled by propelling means into a space at the bottom of the hopper. In this space, the density of the material is made uniform. The material is then introduced into a chamber. A piston with a receding underside reciprocates in the chamber, and presses the material in the passage of the chamber into a mold opening, and shapes it into a desired form. By ejecting the material from the opening, the same amount of the shaped material is provided.

5 Claims, 2 Drawing Sheets

APPARATUS FOR QUANTITATIVELY PROVIDING FOOD MATERIAL

BACKGROUND OF THE INVENTION

1. Field of the Invention

This invention relates to an apparatus for quantitatively providing material which may be used as a filling for a food product including, for instance, a sponge cake such as a Madeleine cake, and particularly relates to an apparatus for providing a uniform amount of low-fluidity food material on a highly fluid or soft material such as a material for a sponge cake.

2. Prior Art

A process for producing a sponge cake such as a Madeleine cake generally comprises the steps of applying a mixture of material of high fluidity that contains sugar, flour, egg or the like, into a cup made of paper or aluminum foil, or a recess provided on a baking pan, and baking it. Nowadays, various new types of confectionery and other products have been developed using similar processes, to produce tasty and rich confectionery or snacks. Such a sponge cake is produced to include a filling material. Such a material comprises a less fluid material and a material containing solids or lumps of materials such as chestnuts, nuts, dried fruits mixed in bean jam, or chopped ham, eggs, and vegetables mixed in tomato sauce.

To produce such a food product automatically, an apparatus for supplying an amount of the filling material to a fluid material in a cup or a recess in a baking sheet is required. Then the fluid material is again applied over the filling material to encrust it.

In prior art, a filling material is provided from a hopper or extruder. To provide the same amount of a filling material, the outlet port of the hopper or extruder is controllably opened and closed. However, if the filling material is a less fluid material and/or contains solids or lumps of materials, it is difficult to quantitatively supply such a material because it often clogs an outlet port or passes through it in irregular quantities. Moreover, a material containing solids or lumps tends to produce uneven gaps in it, so that air is entrapped. The density of the material in a hopper is not uniform. Thus the amount of the material supplied from the hopper per unit time is greatly variable.

U.S. Pat. No. 4,669,967, issued June 2, 1987, assigned to the assignee of this application, discloses an apparatus for quantitatively extruding food materials. This apparatus is especially suitable for supplying a uniform amount of food material that contains solids. In the apparatus a food material is temporarily enclosed in a chamber to form a cylindrical body, and then extruded via a nozzle into bread. The apparatus is highly advantageous in providing a uniform amount of a less fluid material, such as a material containing solids, to bread or confectionery.

However, since such a filling is supplied from a nozzle, the apparatus of the prior art is not suitable for providing a filling shaped into a solid or cohesive form and placing it at a proper position on a soft or highly fluid material for an outer layer of a sponge cake held in a cup or a recess on a baking pan. Where a filling is encrusted in a sponge cake, it should be shaped into a solid or cohesive form and should retain its shape on the fluid material because the form of the filling tends to affect the shape of the finished product. However, the material is readily deformed or broken during the operation. In the apparatus of the prior art the material is always shaped into a cylindrical form. Moreover, when it is supplied onto such a highly fluid material via a nozzle, the cylindrical form is broken and cannot remain as it is.

There has been no automated apparatus for quantitatively supplying such a filling onto a highly fluid or soft material in the prior art. Thus the process for quantitatively supplying such a filling onto a highly fluid material had to be accomplished manually.

SUMMARY OF THE INVENTION

One object of this invention is to provide an apparatus and method for quantitatively supplying a food material of less fluidity and/or a material containing solids or lumps to a soft or highly fluid material.

Another object of this invention is to provide an apparatus and method for quantitatively supplying food material and placing it in a soft or highly fluid material without deforming its form.

In this invention an apparatus for quantitatively producing food material is provided, comprising:
(a) a hopper,
(b) a chamber comprising a passage for said material communicating with said hopper and having an outlet opening.
(c) a plate member having at least one mold and positioned beneath said chamber,
(d) a propelling means disposed in said hopper for causing said material to move into said chamber,
(e) a pushing means provided in said chamber for pushing said material out of said passage and into said mold via said opening, and
(f) an ejecting means for ejecting said material from said mold, wherein said plate member is slidable between a first position, where said mold is positioned beneath said opening in alignment therewith, and a second position, where said mold is positioned adjacent said ejecting means.

Further, according to this invention, a method for quantitatively providing food material is provided, comprising the steps of
(a) introducing said material from a hopper into a chamber having an outlet opening,
(b) pushing a selected amount of said material out of said opening of said chamber into a mold beneath said opening to compact said material in the mold, and
(c) ejecting said material from said mold.

In the apparatus of this invention, the food material contained in the hopper is moved into the chamber by the propelling means and pushed into the mold provided in a plate member to shape it into a solid or cohesive form. Then, the the material shaped into the form defined by the mold is ejected and placed on a highly fluid material for a food such as a sponge cake. Since each piece of material shaped into a specific form has the same volume and density it can be said that the apparatus and method of this invention can precisely measure the amount of each piece of material and divide it from the mass of the material in the hopper.

This is true even if the food material is highly viscous.

Further, since the ejecting means comprises an air jet in a preferred embodiment, it ejects the material from the mold without contacting it. Therefore, the material shaped into a solid or cohesive form cannot be deformed or damaged.

EMBODIMENTS

Figure 1:
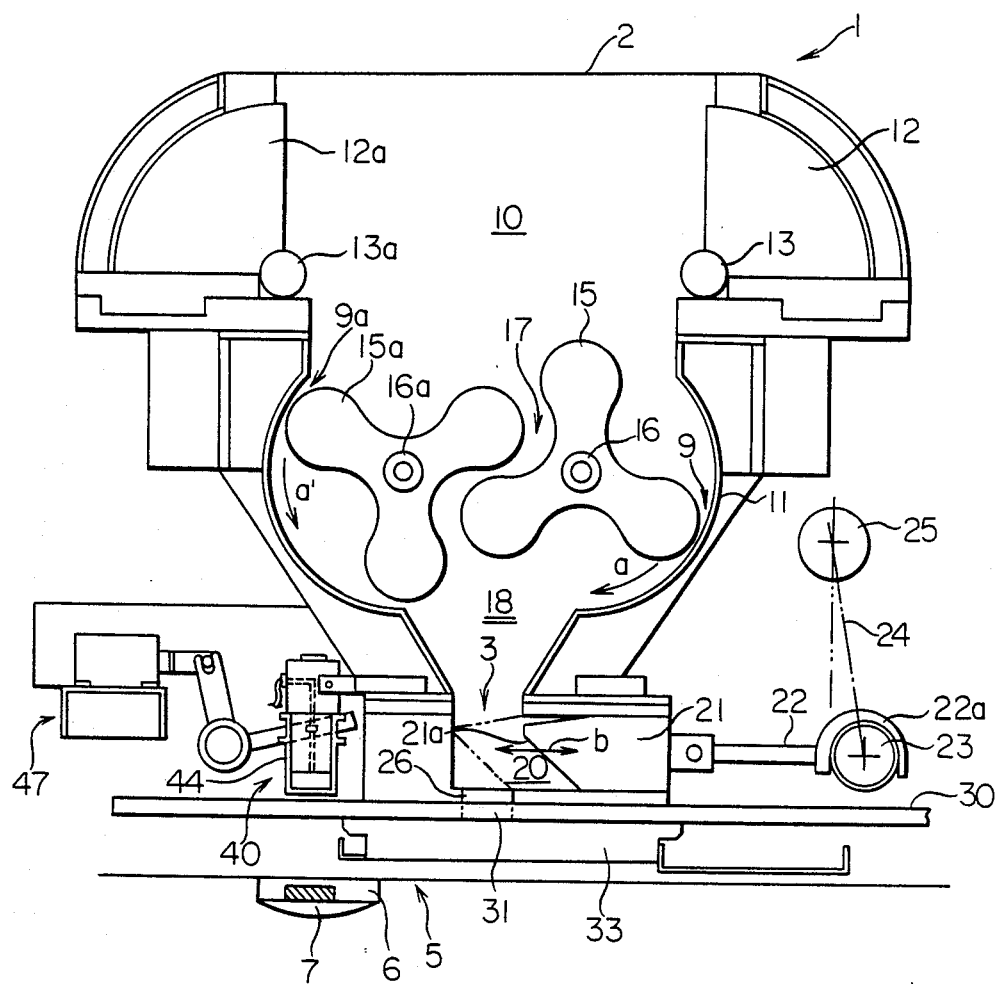
FIG. 1 shows a cross-sectional view of the apparatus of a preferred embodiment of the present invention.

Referring to FIG. 1, the apparatus for quantitatively providing food material of a preferred embodiment of this invention (1) is shown.

The apparatus (1) comprises a hopper (10), an enclosure defining a cylindrical chamber (20), a plate member (30) and an air cylinder assembly (40). The apparatus (1) is arranged above a baking pan (5) on a conveyor (not shown), which receives the food material supplied from the apparatus (1) on a fluid material held in its recess (6) provided on the baking pan, and conveys it to a next station. To simplify the drawing, only one recess is shown in FIG. 1; however, many recesses are provided at selected intervals on the baking pan (5).

As shown in FIG. 1, a pair of pushing blades (12, 12a) is mounted to the hopper (10), adjacent the upper opening (2) thereof, and a pair of Roots blades (15, 15a) are disposed in the lower part of the hopper (10), near the exit opening (3) at its bottom.

The pushing blades (12, 12a) are provided for pushing the food material supplied from the upper opening (2) downward to the Roots blades (15, 15a). In this embodiment, each of the pushing blades (12, 12a) is like a fan in cross-section, but it can take any shape suitable for pushing and moving the material. The pivot points of the blades (12, 12a) are connected to horizontal shafts (13, 13a) mounted on the walls of the hopper (10). The shafts (13, 13a) rotate alternately to pivotally swing the pushing blades (12, 12a) so that the food material adjacent the pushing blades (12, 12a) moves downward to the Roots blades (15, 15a).

The pair of Roots blades (15, 15a) are disposed to provide a narrow space (18) between them and the exit opening (3). Both Roots blades (15, 15a) have the same type of rotating blades and their axes are mounted on driven shafts (16, 16a) supported on the walls of the hopper (10). The shafts (16, 16a) rotates the right blade (15) in FIG. 1 clockwise as indicated by an arrow a and the left blade (15a) counterclockwise as indicated by an arrow a', at the same speed and in such a manner that they do not collide with each other.

Therefore, the material progresses through spaces (9, 9a) between the Roots blades (15, 15a) and the side walls (11) and then into the narrower space (18) adjacent the bottom of the hopper (10). As shown in FIG. 1, in this preferred embodiment, the Roots blades (15, 15a) are arranged to provide a space (17) between them. Thus, through the space (17), air introduced with the material can go out and the material can go back into the open space above the Roots blades (15, 15a) when too much material is supplied to the narrower space (18). Therefore, the pressure in the space (18) is properly adjusted and the density of the material becomes uniform throughout the narrower space.

Beneath the hopper (10), the cylindrical chamber (20) in which a piston (21) is disposed is horizontally positioned. The cylindrical chamber (20) communicates with the hopper (10) via the exit opening (3). The chamber (20) has an outlet opening (26) at its bottom. The outlet opening (26) is positioned in alignment with the exit opening (3) to provide a passage for the material. The piston (21) has a slope (21a) on the front end starting from a point near the ceiling of the chamber (20) and receding away from the passage of the material as shown in FIG. 1. Thus, when the piston (21) is in its forward stroke, the material in the passage is urged by the slope (21a) to progress in the direction of the outlet opening (26). The other end of the piston (21) is connected to a rod (22) which is connected to a sleeve (22a) partially surrounding a shaft (23). The shaft (23) is connected to a driven shaft (25) via an arm (24, not shown). Thus the shaft (25) rotates to swing the arm (24), causing the shaft (23) to swing. Since the shaft (23) slidably engages the sleeve (22a), the piston (21) slidably moves along the inner surface of the cylindrical chamber (20) as indicated by an arrow b.

Beneath the cylindrical chamber (20), the plate member (30) having a mold opening (31) is positioned on, and slidably engages, a guide frame (33) so that the outlet opening (26) and the mold opening (31) are in alignment with each other when the plate member (30) is positioned to receive the material from the cylinder (20). One end of the plate member (30) is connected to a drive means similar to the driven shaft (25) and the arm (24), so that the plate member (30) slidably moves along the guide frame (33). Such a drive means is conventional and thus not shown in FIG. 1.

Adjacent the cylindrical chamber (20) and the plate member (30), an ejecting means (40) is positioned. The ejecting means (40) is connected to a raising and lowering means (47) of a conventional structure to raise and lower the outer cylinder (44) of the ejecting means (40). The outer cylinder (44) is arranged to be lowered when the mold opening (31) of the plate member (30) carrying the material inside is positioned right beneath the ejecting means, and is raised when the plate (30) is retracted.

Figure 2:
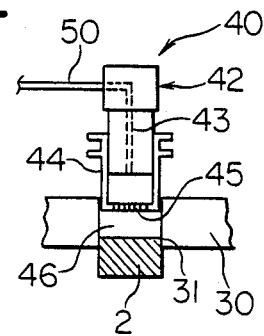
FIG. 2 shows an enlarged cross-sectional view of the ejecting means (40) in the apparatus of FIG. 1.

As shown in FIG. 2, the ejecting means (40) is an air cylinder assembly which comprises an inner cylinder (42) with a through hole (43), an outer cylinder (44) with air blow slits (45) and slidably movable along the inner cylinder (42), and an air supply tube (50) connected to a pump (not shown).

In this air cylinder assembly (40), air provided from the pump flows through the through hole (43) to the space between the inner and outer cylinders (42, 44). By lowering the outer cylinder along the inner cylinder (42) mounted on the enclosure defining the chamber (20), the front end with air blow slits (45) approaches the mold opening. As shown in FIG. 2 the air jet is directed to the material (2) in said mold opening (31), and pushes the material (2) out of the mold opening (31). When the ejecting means (40) ejects the material (2), the front end with air blow slits (45) of the outer cylinder (44) penetrates the mold opening (31) while maintaining a space (46) between the front end and the material (2). Since the space (46) provides an air cushion, the material (2) shaped into a solid or cohesive form defined by the mold opening (31) cannot be harmed. Further, since the material does not contact the front end, no part of the material can adhere to the front end. Therefore the material is properly ejected from the opening (31) and drops onto the highly fluid material (7) in a recess on a pan (5) transferred by a conveyor (not shown).

By reference to FIGS. 3 through 6, the operation of the apparatus (1) will now be discussed.

Figure 3:
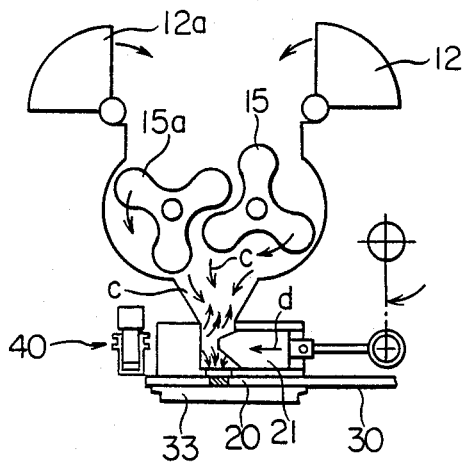
FIGS. 3 to 6 show the operation of the pushing blades, Roots blades, piston and plate member in the apparatus of FIG. 1.

As shown in FIG. 3, at the beginning of the operation the cylindrical chamber (20) is filled with the material which is pushed to the Roots blades (15, 15a) by the pushing blades (12, 12a) and then propelled into the cylindrical chamber (20) through the narrower space (18) as indicated by arrows c by the rotation of the Roots blades (15, 15a) and the retraction of the piston (21).

When the piston (21) advances in the cylindrical chamber (20) as indicated by an arrow d, the material is pushed into the mold opening (31) through the outlet opening (26). The piston (21) stops when the pressure in the cylindrical chamber (17) reaches a preselected value. The motion of the piston is controlled by a sensor (not shown).

Figure 4:
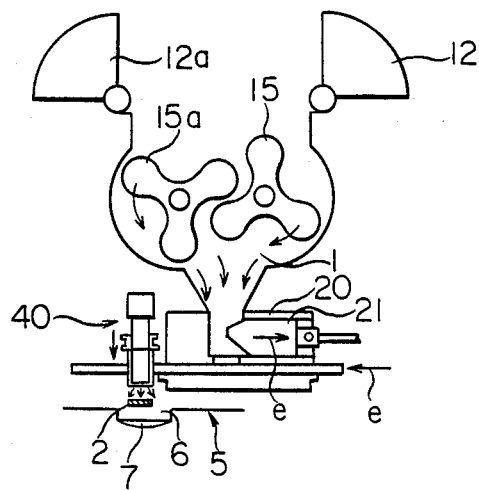

When the sensor detects the stopping of the piston (21), a signal is transmitted to the driver means for the plate member (30) so that the plate member (30) is moved in the direction of an arrow e in FIG. 4, until the material (2) in the mold opening (31) is positioned right beneath the ejecting means (40). The ejecting means (40) is activated to provide an air jet against the material (2) while the outer cylinder (44) of the ejecting means (40) is lowered to approach the material (2). As shown in FIG. 4, the front end of the outer cylinder (44) penetrates the mold opening (31) and the material (2) is completely pushed out of the mold opening (31). When this movement is carried out, the pan (5) having a recess in which a fluid material for a sponge cake (7) is held positioned right beneath the ejecting means (40) and the mold opening (31). Thus the material (2) dropping from the mold opening (31) is received on the fluid material (7) in the recess of the pan (5).

Figure 5:
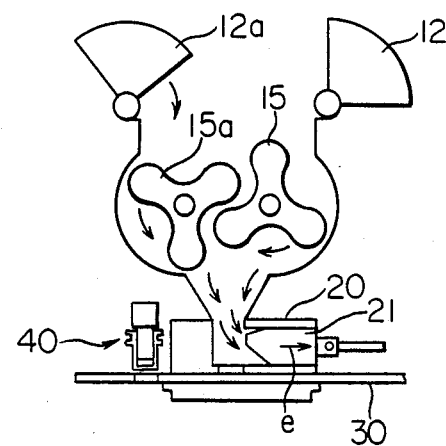

While the ejecting step is carried out, the piston (21) begins to retract. Then the material introduction process begins. During the operation, the pushing blades (12, 12a) are alternatively moved to push the material toward the Roots blades (15, 15a), and then the material is introduced into the narrower space (18) in the hopper (10) by the rotation of the Roots blades (15, 15a). Since the piston (21) retracts in the direction as indicated by an arrow e to reduce the pressure in the cylindrical chamber (20), the material is introduced into it via the outlet opening (3), as shown in FIG. 5. In the apparatus (1), the Roots blades (15, 15a) and the pushing blades (12, 12a) cooperate so that the material is repeatedly pushed toward the Roots blades and introduced into the narrower space (18).

Figure 6:
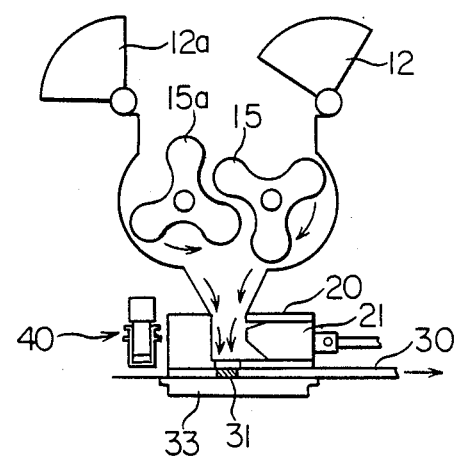

As shown in FIG. 6, when a sensor (not shown) detects the completion of the ejecting step, a signal is transmitted to the driving means for the plate member (30) so that the plate member (30) moves back until the mold opening (31) aligns with the outlet opening (26) of the cylindrical chamber (20). Then the plate member (30) is ready to receive the material from the hopper (10) via the outlet opening (26).

In the apparatus the process described above is repeated and the material of the same volume shaped into the same form is fed onto the fluid material (7) in the recess of a pan (5) conveyed by a conveyor.

To produce a sponge cake with a filling, the material (2) on the fluid material (7) in the recess of the pan (5) is conveyed to the next station where a further fluid material is applied to the material (2) to enclose it completely. Then the pan (5) is transferred into an oven so that the materials are baked. As a result, a sponge cake or Madeleine cake having a filling is produced.

In this preferred embodiment, the material to enclose the filling (2) is discussed as a sponge cake such as a Madeleine, but any kind of encrusting material can be chosen, resulting in various kinds of cake or confectionery having a filling.

The construction of the pushing blades (12, 12a) the Roots blades (15, 15a), the cylindrical chamber (20), and the piston (21), can be modified. The drive means can also be replaced with any type of drive means other than the air cylinder of the preferred embodiment.

According to this invention, an apparatus for quantitatively providing food material which has a simple construction is provided. As a result, a sponge cake or Madeleine with a filling can be produced automatically.

Further, a less fluid material and/or a material containing solid materials or lumps can be measured and divided for supplying a uniform amount of it.

Since the density of the material is made uniform throughout the narrower space (18) and the passage in the cylindrical chamber (20), a uniform amount of the material is introduced into the mold opening. Thus the material of a same form includes a same amount.

The pressure in the narrower space (18) and the passage in the cylindrical chamber (20) is controlled to a selected value so as to not impart too high a pressure to the material. This prevents the compound material in the filling material from being crushed.

Moreover, the material is shaped into a form and remains in such a form without being deformed during the operation, and uniform sponge cakes of a desired form with a filling can be produced.

I claim:

1. An apparatus for quantitatively providing food material comprising:
   (a) a hopper,
   (b) a chamber including a passage for said material communicating with said hopper and having an outlet opening,
   (c) a plate member having at least one mold and positioned beneath said chamber,
   (d) a pair of propelling blades, disposed in said hopper and positioned to provide a space for return movement of said material therebetween, for introducing said material into said chamber by alternately rotating said blades in opposite directions,
   (e) a pushing means provided in said chamber for pushing said material out of said passage and into said mold via said opening, and
   (f) an ejecting means for ejecting said material from said mold,
   wherein said plate member is slidable between a first position, where said mold is positioned beneath said opening in alignment therewith, and a second position, where said mold is positioned adjacent said ejecting means.

2. The apparatus of claim 1, wherein said pushing means includes a slope receding in the direction of said opening, away from the passage of the material.

3. The apparatus of claim 1, wherein said ejecting means comprises an air jet to direct air to said material in said mold to eject it from said mold.

4. The apparatus of claim 3, wherein said air jet comprises an air cylinder assembly, including an inner cylinder with a through hole, an outer cylinder with air blow slits being slidably movable along the inner cylinder, and an air supply tube connected to the through hole of said inner cylinder.

5. The apparatus of claim 1, further comprising a conveyor means for receiving and conveying said material ejected from said mold.

* * * * *